J. K. JENSEN.
MACHINE FOR CUTTING THE ENDS OF CLAY PIPES IN AN UNDULATING LINE.
APPLICATION FILED JAN. 27, 1914.
1,108,845.
Patented Aug. 25, 1914.
3 SHEETS—SHEET 1.
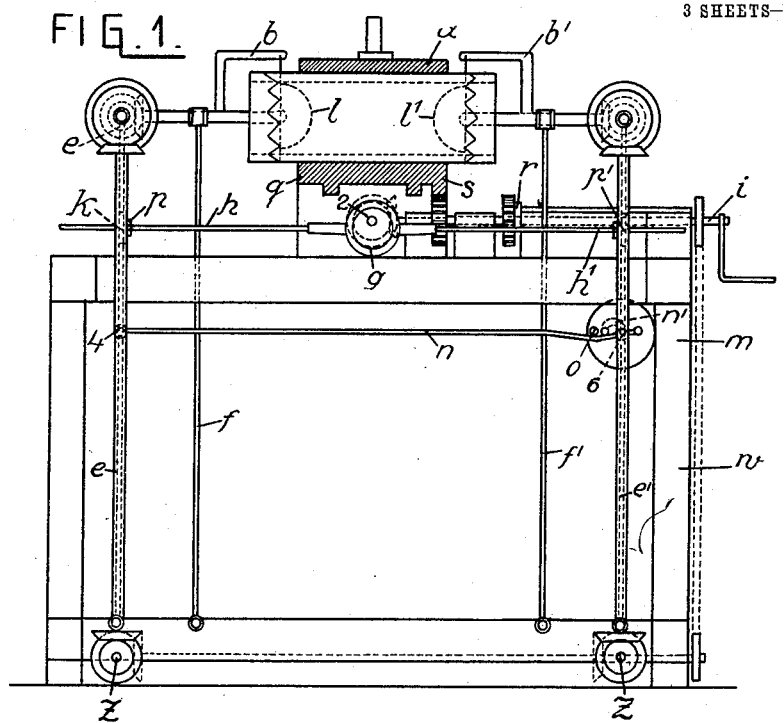
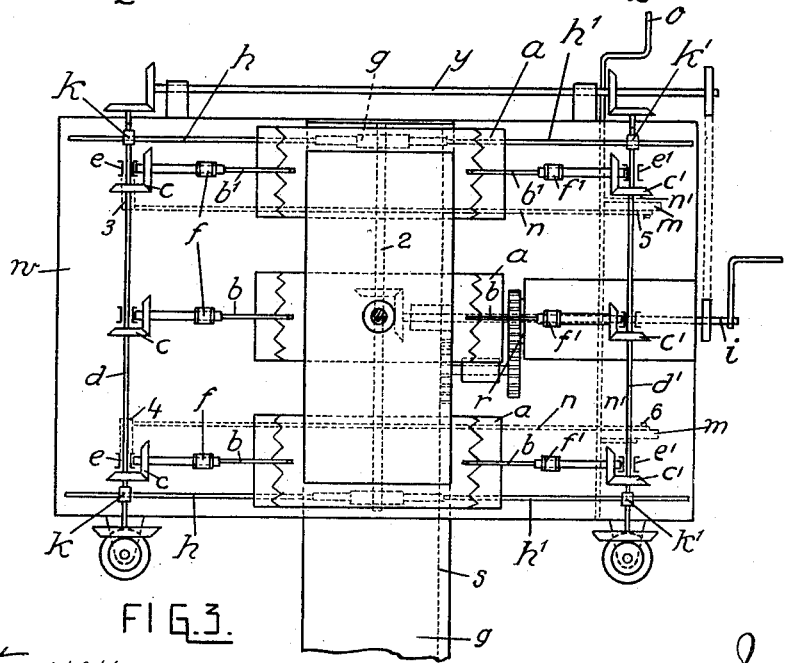

J. K. JENSEN.
MACHINE FOR CUTTING THE ENDS OF CLAY PIPES IN AN UNDULATING LINE.
APPLICATION FILED JAN. 27, 1914.

1,108,845.

Patented Aug. 25, 1914.
3 SHEETS—SHEET 3.

UNITED STATES PATENT OFFICE.

JENS K. JENSEN, OF KLÜTZOW, POMERANIA, GERMANY.

MACHINE FOR CUTTING THE ENDS OF CLAY PIPES IN AN UNDULATING LINE.

1,108,845.  Specification of Letters Patent. Patented Aug. 25, 1914.

Application filed January 27, 1914. Serial No. 814,772.

*To all whom it may concern:*

Be it known that I, JENS K. JENSEN, a subject of the King of Denmark, residing at Klützow, Pomerania, in the Kingdom of Prussia, German Empire, have invented certain new and useful Improvements in Machine for Cutting the Ends of Clay Pipes in an Undulating Line; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a machine for cutting the ends of clay pipes in an undulating line.

The invention consists in the employment of thin wires which are held taut, and by the aid of which it is possible to obtain an accurate and smooth cut. These wires are held in frames which engage the two ends of the respective pipes to be cut.

In the machine constructed according to the present invention frames, resembling saw frames are provided at the two ends of the pipe, which is secured on a reciprocatory slide. These frames are swiveled independently of each other and may be moved toward and from each other for introducing the pipes. During the cutting operation they are arranged to be reciprocated by means of an eccentric.

The present invention is exemplified in the accompanying drawing, in which—

Figure 2:
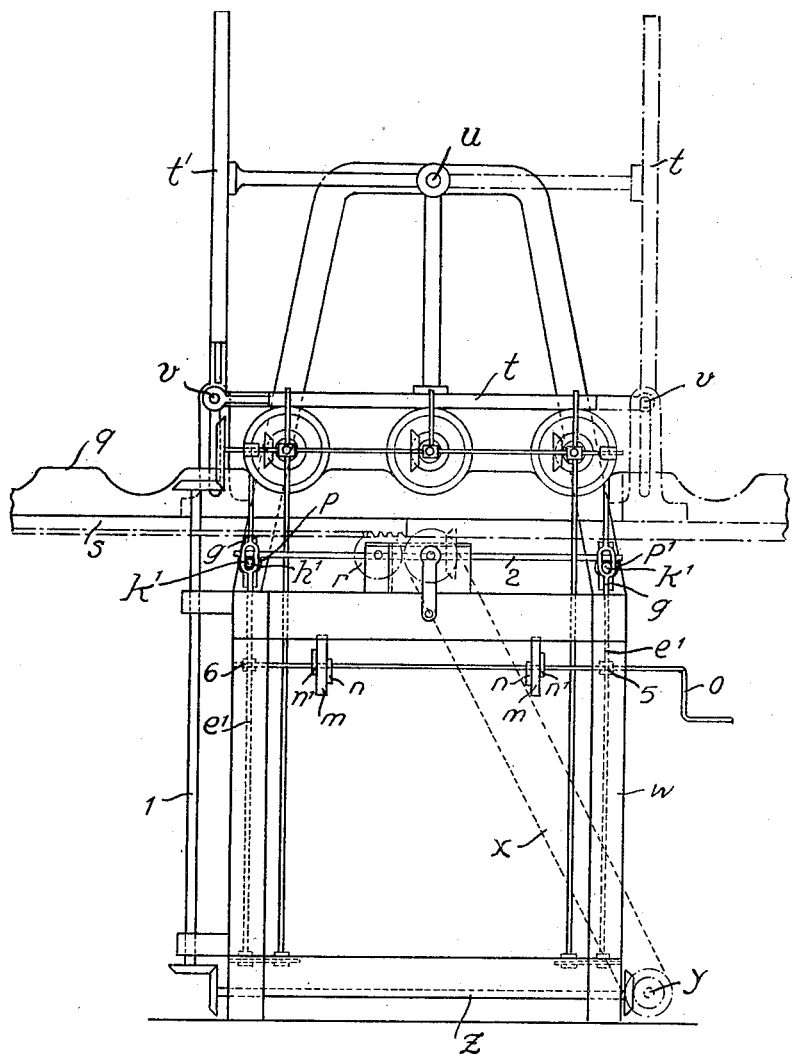
Figure 4:
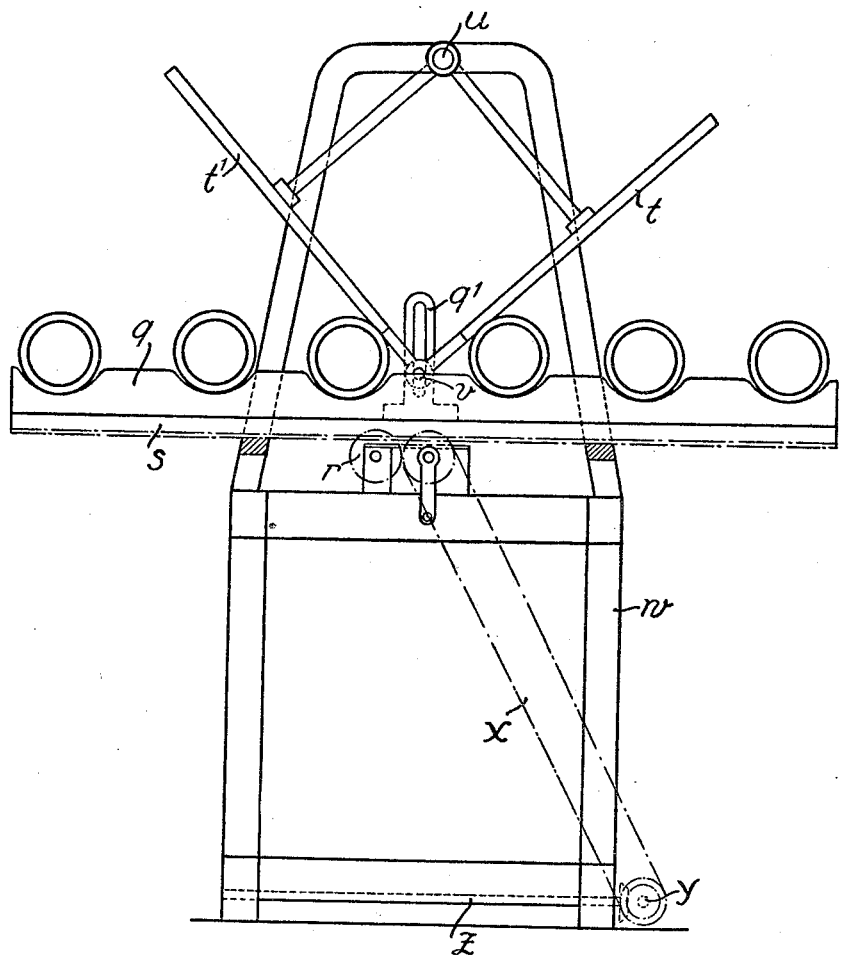

Figure 1 is a side elevation, Fig. 2 a front elevation, Fig. 3 a plan of the machine. Fig. 4 is a front elevation of the machine with the slide and the holders in intermediate position, the cutting gear having been omitted for sake of a greater clearness.

The machine consists of a frame $w$, on which are mounted any required number of cutting devices and a separate carriage for receiving and holding the pipes $a$. In the machine shown in the drawings, arrangement is made for cutting three pipes at a time. The carriage $q$ is provided with semi-circular recesses for receiving a plurality of pipes to be cut, six recesses being shown in Fig. 4 of the drawing, of which recesses three serve for taking fresh pipes or for removing pipes which have been cut. The carriage is alternately advanced to the right and the left respectively across the frame $w$ by means of a rack $s$, after the clutch $r$ on the main shaft has been engaged. One half of the carriage is therefore always free for the finished pipes to be removed or for fresh pipes to be placed on it. During the reciprocating travel of the carriage two holders $t$, $t^1$ (Figs. 2 and 4) are reciprocated, the supporting rods of which are pivoted on the one hand at the stationary fulcrum $u$ in the frame of the machine, on the other hand at the movable point $v$, in the slotted guide $q^1$ fitted to the carriage. At each reciprocation of the carriage $q$ the holders $t$, $t^1$ swing around the fixed point $u$ through a right angle, while the point $v$, at which the extensions of the holders meet, slides in the guide $q^1$.

In Fig. 4 the holders $t$, $t^1$ are shown in their intermediate position, and from this figure it may also be seen, how the ends of the holders $t$, $t^1$ are passed, during their swing, between the pipes. When the carriage $q$ travels to the left, the holder $t$ will, at the end of the travel bear with a steady pressure on the pipes on the carriage, which are to be cut, and will thereby hold them immovable for the cutting operation. Opposite the two ends of the cutter frames $b$, $b^1$ are mounted and arranged to revolve around the axis of the pipes. These frames have the shape of a U the open part turned toward the pipes and having a thin wire fixed taut in it. These frames are revolved by means of shafts $d$, $d^1$ extending across behind the frames and the bevel gears $c$, $c^1$. The shafts $d$, $d^1$ are driven from the main shaft $i$ by means of the chain gear $x$, the horizontal shafts $y$, $z$ and the vertical shaft $l$ with the respective sprockets. The shafts $d$, $d^1$ and the frames $b$, $b^1$ are supported by rods $e$, $e^1$ and $f$, $f^1$ respectively, which rock on stationary points in the base of the frame of the machine, the upper and lower journaling points being in the same planes, so that a parallel link gear is formed. For producing the desired undulating cut these link guides are reciprocated during the rotation of the cutting frames. This reciprocation is obtained by means of an eccentric $g$ and the eccentric rods $h$, $h^1$. The shaft 2, on which the eccentrics are fitted, is continuously driven by the main shaft $i$ in known manner during the cutting operation. The eccentric rods $h$, $h^1$ pass through slot guides $k$, $k^1$ in the rods $e$, $e^1$ respectively and have stops $p$, $p^1$ fitted near their ends. A crank shaft $o$ provided with eccentrics $m$, is journaled in the machine frame $w$. To these eccentrics are fitted connecting rods $n$, $n^1$. The rods $n$, $n^1$ are rigidly coupled at the points 3 and 4 to rods $e$, and at the points 5 and 6 to rods $e^1$. When the crank handle $o$ is turned through half a revolution, the two parallel link guides with the cutting frames $b$, $b^1$ and the supporting plugs $l$, $l^1$, Fig. 1, for the pipes are moved apart, so that the carriage with the pipes can be advanced. The supporting plugs $l$, $l^1$ are semicircular plugs secured to the inward ends of the cutting frames, and intended to afford a support to the pipes while they are being cut, and at the same time to smooth the inside of the cut. By the reversed rotation of the crank handle the supporting plugs and the cutting frames are introduced into the pipes, and the machine is now in operative position. In order to allow the parallel link guides to be thus moved toward and from each other, it is necessary that the connections with the eccentric rods $h$, $h^1$ be loose. As the two guides are linked to the rods $n$, $n^1$, they will thereafter be jointly drawn to the left by the eccentric rod $h$, and to the right by the eccentric rod $h^1$. The supporting plugs $l$, $l^1$ revolve with the sawing frames, and reciprocate within the pipes, thereby smoothing the inside of the cut.

The machine hereinbefore described may be designed either for hand power or for mechanical drive.

I claim—

1. A machine for cutting the ends of pipes in an undulating line, comprising a reciprocable carriage for the pipes, means for holding the pipes thereon, cutting frames arranged in pairs, one on each side of said carriage, means for revolving the cutter frames around the axes of the respective pipes, an eccentric adapted to reciprocate said frames axially to said pipes, and means for moving said frames into and out of operative position.

2. A machine for cutting the ends of pipes in undulating lines, comprising a reciprocable carriage for the pipes, means for holding the pipes thereon, cutter frames arranged in pairs, one on each side of said carriage, driving gears for revolving said frames around the axes of the respective pipes, oscillatory, parallel guided supports for said gears and frames, and means for swinging said supports to reciprocate the gears and frames axially of the pipes.

3. A machine for cutting the ends of pipes in undulating lines, comprising a reciprocable carriage for the pipes, means for holding the pipes thereon, cutter frames arranged in pairs, one on each side of said carriage, driving gears for revolving said frames around the axes of the respective pipes, oscillatory, parallel guided supports for said gears and frames, means for swinging said supports to reciprocate the gears and frames axially of the pipes, and means for moving the frame into and out of operative position.

4. A machine for cutting the ends of pipes in undulating lines, comprising a reciprocable carriage for the pipes, means for holding the pipes thereon, cutter frames arranged in pairs, one on each side of said carriage, driving gears operated by a common shaft for revolving said frames around the axes of the respective pipes, oscillatory, parallel guided supports for said gears and frames, an eccentric, rods connecting the latter with the supports and adapted to reciprocate the frames axially of the pipes, and means for moving the supports independently of said rods to permit the movement of the carriage.

5. A machine for cutting the ends of pipes in an undulating line, comprising a carriage for the pipes, a driving shaft, means operated by the latter for reciprocating the carriage, cutting frames arranged in pairs, one on each side of said carriage, parallel swinging supports for said frames, driving mechanism coupled with said supports adapted to revolve the frames around the axes of the respective pipes, an eccentric driven from the driving shaft adapted to reciprocate the frames axially to the pipes, means for moving the frames into and out of operative position, and holders pivoted to the machine frame and slidably connected to the carriage adapted to hold the pipes during the cutting operation.

6. A machine for cutting the ends of pipes in an undulating line, comprising a reciprocable carriage for the pipes, means for holding the pipes thereon, cutting frames arranged in pairs, one on each side of said carriage, means for revolving the cutting frames around the axes of the respective pipes, an eccentric adapted to reciprocate said cutting frames axially to said pipes, a supporting plug fitted to one arm of each of said cutting frames adapted to enter the pipe being cut and smooth the inside of said cut, said cutting frames adapted to revolve with said plugs during the cutting operation coaxially to the respective pipes, and means for moving said cutting frames into and out of their operative position.

In testimony that I claim the foregoing as my invention, I have signed my name in presence of two subscribing witnesses.

JENS K. JENSEN.

Witnesses:
WALTER MALBRANE,
A. JENSEN.